UNITED STATES PATENT OFFICE.

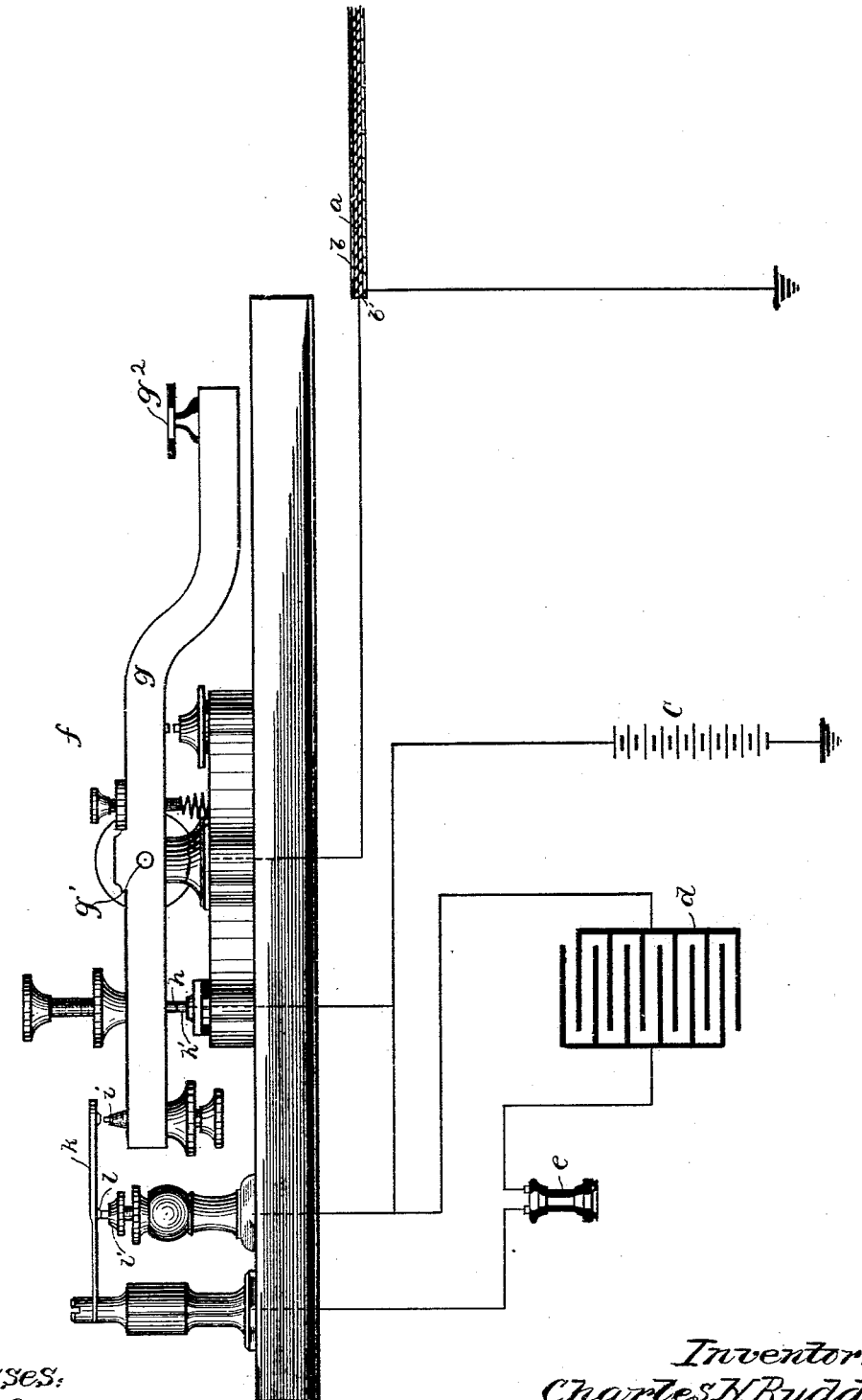

CHARLES H. RUDD, OF EVANSTON, ASSIGNOR TO THE WESTERN ELECTRIC COMPANY, OF CHICAGO, ILLINOIS.

ELECTRIC MEASURING APPARATUS.

SPECIFICATION forming part of Letters Patent No. 504,754, dated September 12, 1893.

Application filed October 19, 1891. Serial No. 409,198. (No model.)

*To all whom it may concern:*

Be it known that I, CHARLES H. RUDD, a citizen of the United States, residing at Evanston, in the county of Cook and State of Illinois, have invented a certain new and useful Improvement in Electric Measuring Apparatus, (Case No. 11,) of which the following is a full, clear, concise, and exact description, reference being had to the accompanying drawing, forming a part of this specification.

My invention relates to apparatus for measuring resistances. Its object is to provide more simple and reliable means for making such measurements, of such a character as to be readily portable.

My invention is especially adapted to the measurement of the insulation resistance of cables and other conductors, since it may be readily moved from place to place, is quickly brought into use, and requires no adjustment.

My invention comprises a source of electricity, one side of which is connected to one of the conductors between which the insulation resistance is to be measured, a condenser, a telephone receiver, and a key adapted alternately to connect in series the source of electricity, the resistance to be measured, and the condenser, or to provide a path for the discharge of the condenser through the telephone. When, by means of the key, the source of electricity, the condenser, and the resistance are in series the condenser slowly accumulates a charge; the time in which a charge of given amount is produced being proportional to the resistance of the insulator. The key is then thrown into its alternate position, when a click is heard in the telephone. The resistance of the insulator may be arrived at roughly by the measurement of the loudness of the click produced, when the condenser has been charging during a given time; but I prefer to discharge the condenser after such a time of charging that the sound in the telephone shall be barely audible, noting the length of the time required for the condenser to become charged to this amount. This time may be compared with the time required to charge the same condenser from an equivalent battery through a known resistance.

I have shown the apparatus of my invention in the accompanying drawing.

In the drawing $a$ is a sheathed cable, whose insulation between sheath $b$ and core $b'$ is to be measured. A connection is extended from the sheath $b$ to earth.

$C$ is a testing battery of several cells.

$d$ is a condenser.

$e$ is a telephone receiver.

$f$ is a key, having a lever $g$ pivoted at $g'$, and furnished with a handle $g^2$. The lever $g$ carries an adjustable contact point $h$ adapted to rest upon an insulated anvil $h'$ when the key is in the position shown; and a contact $i$ adapted to come into contact with and raise the spring $k$ when the handle $g^2$ is depressed. The spring $k$ is provided with a contact point $l$ adapted to rest against an anvil $l'$ when the key is in its normal position. When the lever is depressed the contacts $h$—$h'$ are first separated, then simultaneously the contacts $i$ and $k$ are closed and contacts $l$—$l'$ are separated. One pole of the battery $c$ is connected to the sheath $b$ of the cable $a$; the other to one side of condenser $d$, and to contact anvils $h'$ and $i$. The other side of condenser $d$ is connected through telephone $e$ to spring $k$. Thus, when handle $g^2$ is depressed, condenser $d$, battery $c$ and the insulating material of the cable $a$ are all in series as described; but when the key is allowed to assume its normal position, the condenser is short circuited through the telephone $e$.

In practice the battery $c$ may be of only a few cells. The condenser $d$ may be of capacity suited to the work to be done; thus, increasing the capacity of the condenser results in increased accuracy and sensitiveness of the apparatus.

All the apparatus may be conveniently mounted in a suitable case, so as to be portable.

Many other circuit connections might be readily devised to accomplish the same result. Hence I do not limit myself to the precise form shown.

Having thus described my invention, I claim as new and desire to secure by Letters Patent—

1. The combination, with a resistance to be measured, a condenser, and a battery, of suitable means adapted alternately to connect the resistance, condenser, and battery in series, or to discharge the condenser through the telephone, substantially as and for the purpose described.

2. The herein described method of measuring resistances which consists in charging a condenser through the resistance by a battery, noting the time the condenser is charging, subsequently discharging the condenser through a telephone and noting the loudness of the click and comparing the time thus required to charge the condenser with the time required to charge the same condenser from an equivalent battery through a known resistance and in which the click caused by the discharge of the condenser was of the same degree of loudness, substantially as described.

In witness whereof I hereunto subscribe my name this 7th day of August, A. D. 1891.

CHARLES H. RUDD.

Witnesses:
FRANK R. MCBERTY,
GEORGE L. CRAGG.